United States Patent
Sakamoto et al.

(10) Patent No.: US 7,428,012 B2
(45) Date of Patent: Sep. 23, 2008

(54) IMAGE PROCESSING METHOD INCLUDING GENERATING FACE REGION INFORMATION AND A DIGITAL CAMERA INCLUDING FACE REGION IDENTIFICATION UNIT

(75) Inventors: Koichi Sakamoto, Saitama (JP); Makoto Tsugita, Saitama (JP); Manabu Hyodo, Saitama (JP); Hirokazu Kobayashi, Saitama (JP); Koji Ichikawa, Saitama (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 684 days.

(21) Appl. No.: 10/689,606

(22) Filed: Oct. 22, 2003

(65) Prior Publication Data

US 2004/0080634 A1    Apr. 29, 2004

(30) Foreign Application Priority Data

Oct. 23, 2002    (JP)    ............ P.2002-308750

(51) Int. Cl.
- *H04N 5/217* (2006.01)
- *H04N 5/228* (2006.01)
- *H04N 5/208* (2006.01)
- *H04N 5/225* (2006.01)
- *G06K 9/00* (2006.01)

(52) U.S. Cl. ............ 348/241; 348/222.1; 348/252; 348/220.1; 348/169; 382/118

(58) Field of Classification Search ............ 348/241, 348/251, 252, 222.1, 220.1; 382/118
See application file for complete search history.

(56) References Cited

U.S. PATENT DOCUMENTS

| | | | | |
|---|---|---|---|---|
| 5,835,616 | A * | 11/1998 | Lobo et al. | 382/118 |
| 6,940,545 | B1 * | 9/2005 | Ray et al. | 348/222.1 |
| 7,038,715 | B1 * | 5/2006 | Flinchbaugh | 348/222.1 |
| 7,092,573 | B2 * | 8/2006 | Luo et al. | 382/228 |
| 2003/0071908 | A1 * | 4/2003 | Sannoh et al. | 348/345 |
| 2003/0151674 | A1 * | 8/2003 | Lin | 348/222.1 |

FOREIGN PATENT DOCUMENTS

| | | |
|---|---|---|
| EP | 1 128 316 A1 | 8/2001 |
| JP | 2001-309225 | 11/2001 |

* cited by examiner

*Primary Examiner*—Nhan T Tran
(74) *Attorney, Agent, or Firm*—McGinn IP Law Group, PLLC

(57) ABSTRACT

Effectively reducing a noise on the face region to improve the picture quality of the entire image A digital camera according to the invention includes: an digital signal processor for performing image processing including contour correction on a shot image; a face identifying section for analyzing an image after contour correction to generate face region information to identify the face region; a noise reducing section for performing noise reduction on the face region of the image after contour correction based on the face region information; a controller 106 for determining the photographing mode of the shot image and operating the face identifying section and the noise reducing section depending on the photographing mode.

18 Claims, 2 Drawing Sheets

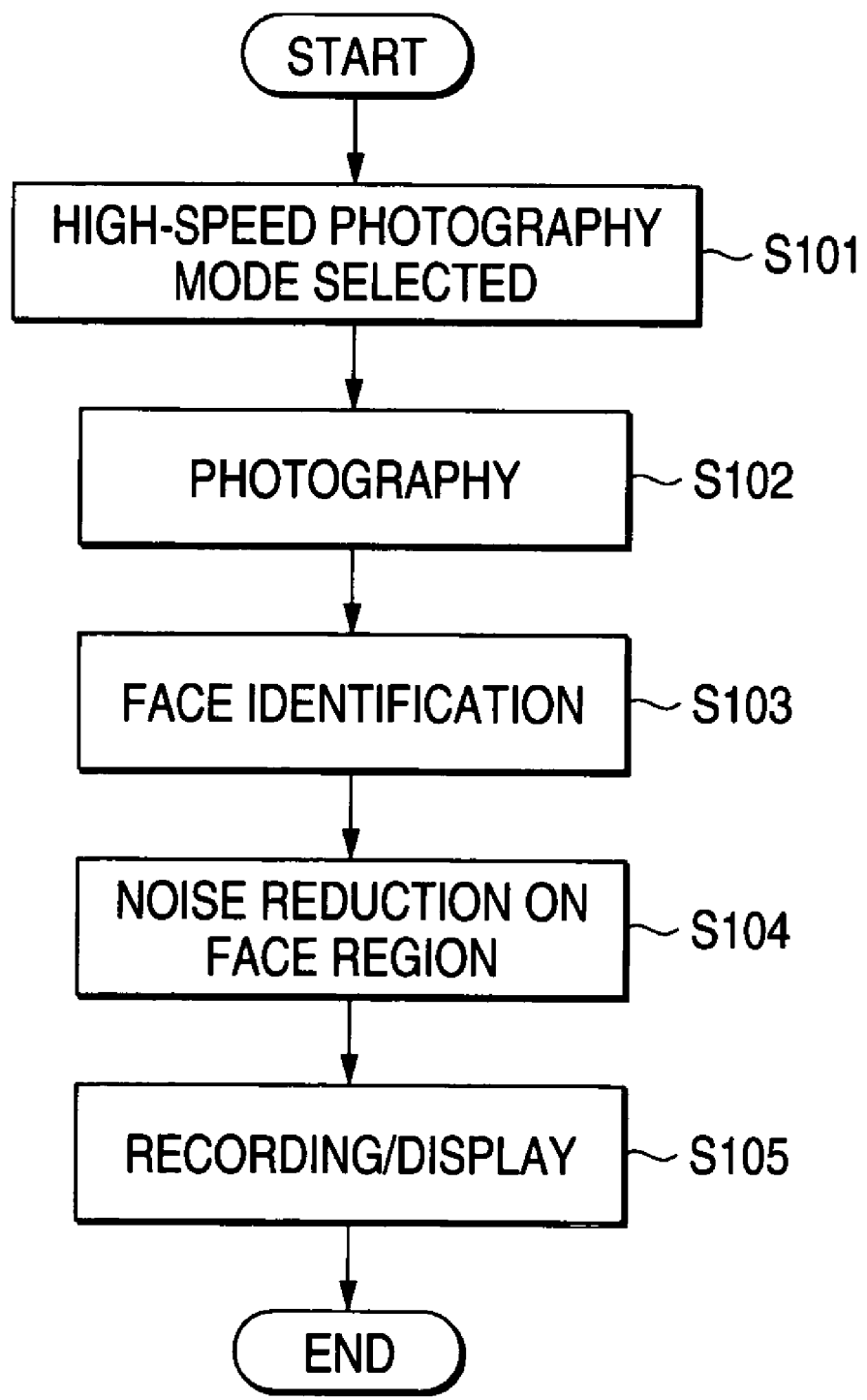

IMAGE PROCESSING METHOD INCLUDING GENERATING FACE REGION INFORMATION AND A DIGITAL CAMERA INCLUDING FACE REGION IDENTIFICATION UNIT

BACKGROUND OF THE INVENTION

1. Field of the Invention

The present invention relates to an image processing method and a digital camera which use a face extracting technology to improve the picture quality.

2. Description of the Related Art

A related art camera which uses a silver halide film is capable of performing photographing at a low illuminance by using a high-speed film. In recent years, digital cameras featuring a high-speed photography mode which performs photography without using a silver halide film have been developed. This capability is made feasible by a sensitivity enhancement circuit which extends the full-aperture time of the electronic shutter of a solid-state image pick-up device, that is, the storage time of an electric charge on a solid-state image pick-up device, integrates the images of a plurality of frames into a frame memory, or adds peripheral pixels in the same frame.

The photography in the high-speed photography mode experiences an insufficient quantity of light thus includes a noise more often. Such a noise appears as graininess or roughness in an image and degrades the picture quality. In particular, when a noise component is conspicuous on the face of a person as a subject, the most important element of the image, the texture of the skin of the face is impaired, which gives an unfavorable impression to an observer. The region of a human body where the picture quality shows largest degradation due to a noise is the face, which is a site where noise reduction is most effective.

A related art aiming at improvement of the quality of a picture including the face of a subject is disclosed for example in the Japanese Patent Laid-Open No. 2001-309225.

The related art technology disclosed in the Japanese Patent Laid-Open No. 2001-309225 changes the exposure or color balance depending on whether the face of a subject appears in the image. The processing addresses the entire image so that it cannot achieve noise reduction dedicated to the face conducive to improvement of picture quality. For example, performing noise reduction on the entire image removes the edge component of the contour thus resulting in a flat image as a whole.

SUMMARY OF THE INVENTION

The invention has been accomplished in view of the aforementioned circumstances and aims at providing an image processing method and a digital camera capable of effectively reducing a noise on the face of a subject to improve the quality of the entire image.

An image processing method according to the invention is an image processing method for performing image processing on image data, the method comprising: a step of generating face region information to identify the face region from the image data and a step of performing noise reduction on the face region of the image data based on the face region information.

A digital camera according to the invention comprises: image processing means (a digital signal processor 107) for performing image processing including contour correction on a shot image; face region identification means (a face identifying section 114) for analyzing an image after contour correction to generate face region information to identify the face region; noise reduction means (a noise reducing section 115) for performing noise reduction on the face region of the image after contour correction based on the face region information; photographing mode determination means (a controller 106) for determining the photographing mode of the shot image; and control means (the controller 106) for operating the face region identifying means and the noise reduction means depending on the photographing mode.

According to the invention, it is possible to identify a face region in an image and perform noise reduction on the face region. This makes it possible effectively reduce a noise on the face thus improving the quality of the entire image.

BRIEF DESCRIPTION OF THE DRAWINGS

FIG. 2 is a flowchart showing the operation procedure of the digital camera.

DETAILED DESCRIPTION OF THE PREFERRED EMBODIMENTS

Figure 1:
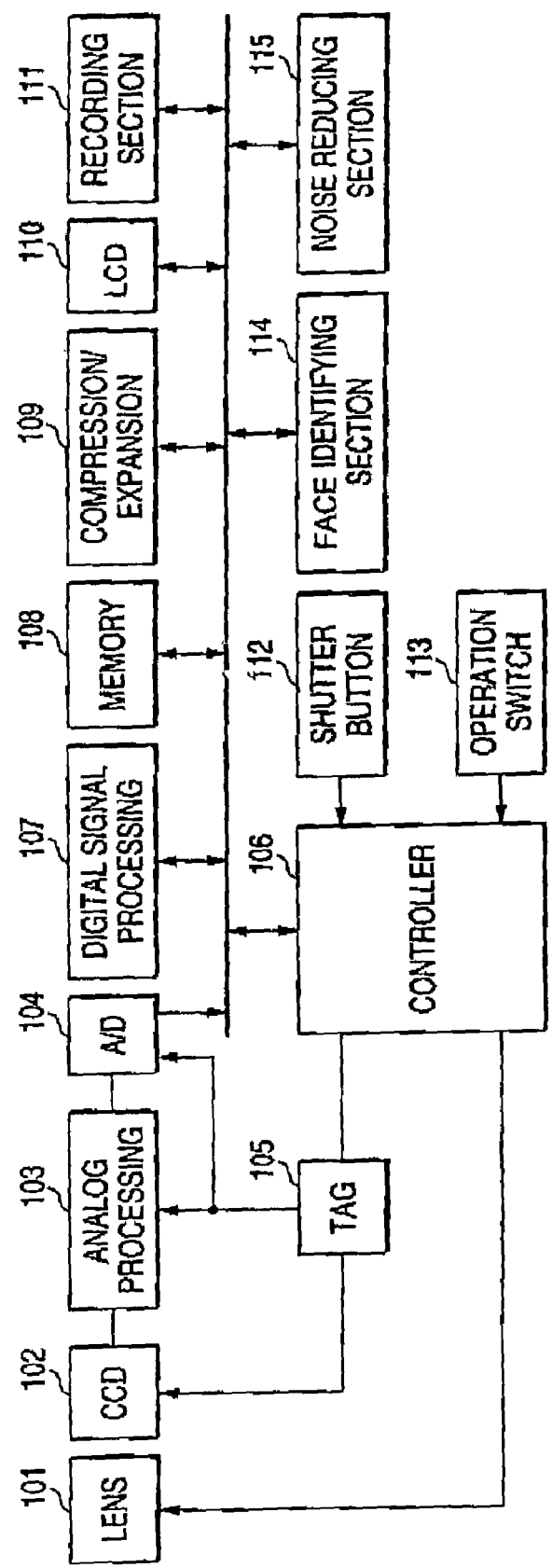
FIG. 1 is a block diagram showing the configuration of a digital camera according to an embodiment of the invention.

An embodiment of the invention will be described referring to the drawings.

FIG. 1 is a block diagram showing the configuration of a digital camera according to an embodiment of the invention. Generally, the digital camera comprises a lens 101, CCD 102, an analog signal processor 103, an A/D converter 104, a TG (timing generator) 105, a controller 106, a digital signal processor 107, a memory 108, a compressor/expander 109, an LCD 110, a recording section 111, a shutter button 112, an operation switch 113, a face identifying section 114, and a noise reducing section 115.

The lens 101 is a zoom lens (variable-focus lens) equipped with the AF (automatic focus) mechanism. The AF mechanism and the zoom mechanism of the lens 101 are driven by a driver circuit (not shown). A fixed-focus lens equipped with the AF mechanism alone may be used instead of a zoom lens.

The CCD 102 is an optical sensor having a large number of photo-detection devices arranged in a matrix or honeycomb shape. The CCD 102 is arranged in a position in the internal of the camera corresponding to the focal point of the lens 101.

The analog signal processor 103 performs predetermined analog processing on a picture signal output from the CCD 102 and outputs R, G, B signals per pixel. The analog signal processor 103 comprises a CDS (Correlated Double Sampling) circuit and an AGC (Automatic Gain Control) circuit therein. The CDS circuit performs noise reduction on a picture signal. The AGC circuit performs level adjustment on each picture signal by way of gain adjustment.

The A/D converter 104 converts the R, G, B signals sequentially applied by the analog signal processor 103 to digital R, G, B signals and outputs the same signals.

The timing generator 105 supplies a timing signal to the CCD 102, the analog signal processor 103, and the A/D converter 104 in order to provide synchronization between these circuits.

The controller 106 controls the sections of the digital camera inter connected via a bus to perform centralized control relating the photographing operation of the digital camera. The controller 106 plays the role of control means for performing control such as AF (automatic focus), AE (automatic exposure) and AW (automatic white balance) based on an input from the shutter button 112 or the operation switch 113. The controller 106 performs data exchange with peripherals and timing control as well as software-based features. To control ON/OFF of the face identification or noise reduction depending on the photography mode, the controller 106 determines the photography mode based on a mode selection signal from the photography mode switch on the camera or photography mode information included in the information corresponding to each image recorded onto a recording medium. By selecting processing depending on the photography mode, it is possible to obtain a crisp image whose contour has been emphasized by the digital signal processor without the edge component on the contour being removed by noise reduction, in a photography mode other than the high-speed mode where a noise occurs more frequently.

The digital signal processor 107 performs various processing, on the input image data, including white balance correction, gamma (γ) correction, contour correction, color correction and YC processing. The image data converted to a luminance signal (Y signal) and a color-difference signal (Cr, Cb signal) by the digital signal processor 107 is stored into the memory 108 for temporarily storing image data via a bus. The YC signal is compressed by the compressor/expander 109 in accordance with a predetermined format and recorded onto a recording medium such as a memory card via the recording section 111.

The memory 108 comprising for example a DRAM serves as a buffer memory for temporarily storing image data acquired. For various processing, image data is read into each section connected via a bus and written back after being processed.

The compressor/expander 109 compresses the image data stored into the memory 108 by using a predetermined compression system such as the JPEG system and records the resulting data onto a recording medium mounted in the recording section 111. The compressor/expander 109 also expands the image data read from the recording medium. The image data to be compressed by the compressor/expander 109 has been converted to luminance data and color-difference data Cr, Cb (YC separation) and is stored in the memory 108. To regenerate and display the image data stored on the recording medium, the luminance signal and the color-difference signal generated by YC separation are converted to RGB signals.

The LCD 110 is a display for image display and is driven by an LCD driver (not shown) based on RGB signals. The image data temporarily stored in the memory 108 undergoes predetermined processing and is transferred to the LCD 110, where a color image is displayed. During photography, the LCD is used as a viewfinder to determine the correct photographing range.

The recording section 111 records the acquired image data and tag information per image data piece onto a recording medium such as a memory card. The particular recording process is: when photography (acquisition of image data) is instructed by a push on the shutter button 112, a thumbnail image of an image stored onto the memory 108 after the series of image processing and a compressed image in the JPEG format are generated. Both images are recorded onto a recording medium together with the information on the shot image including photography mode information, a frame number, an exposure value, a shutter speed, a compression factor, a date of photography, data on the flashlight ON/OFF at photography and information on the scene.

The face identifying section 114 identifies a region corresponding to the face of a person in an image from image data in order to generate face identifying information. The face identification is made on the image data which has undergone the contour correction by the digital signal processor 107. A method for identifying the face region may be a well known technology (such as the Japanese Patent Laid-Open No. 101579/1997).

The noise reducing section 115 performs noise reduction exclusively on the face region present in an image based on the face identification information generated by the face identifying section 114. The noise reduction is made by way of the well known technology using a low-pass filter.

Next, operation of a digital camera according to the invention will be described referring to the flowchart of FIG. 2.

When the high-speed photography mode is selected on the mode switch of the digital camera, the digital camera is placed in the mode where a face region is identified in the image acquired so as to perform nose reduction on the face region (step S101) When the shutter button 112 of the digital camera is pressed, photography under focusing and proper exposure by way of AE and AF is carried out. The image data which has undergone predetermined signal processing and image processing is stored into the memory 108 (step S102).

Next, the image data temporarily stored into the memory 108 is transferred to the memory in the face identifying section 114, followed by face identification in the face identifying section 114 (step S103). Next, noise reduction on the identified face region is performed by the noise reducing section 115 (step S104).

The image data which has undergone noise reduction on its face region is recorded onto a recording medium by the recording section 111. The image is displayed on the LCD 110 as required (step S105).

With the noise reduction process, the acquired image data is recorded in a favorable image corrected to represent a smooth texture having minimized roughness of the face while retaining a crisp presentation as a whole. That is, even in the high-speed photography mode where a noise occurs more frequently than in the low-speed photography mode, automatic correction is made to provide a good texture of the face of a subject.

In case a plurality of face regions are identified in the face identification process (that is, in case a plurality of persons are shot as subjects) in the foregoing embodiments, the noise reduction is performed on the plurality of face regions.

While the noise reduction according to face identification is made on detecting the high-speed photography mode where a noise occurs more frequently in the foregoing example, the noise reduction maybe made on detecting a portrait photography mode in order to enhance the accuracy of the face identification process. The noise reduction may be made on all the images including faces. In this case, noise reduction may be made on detecting the portrait mode alone. Further, ON/OFF of the face identification or noise reduction may be controlled depending on the photography mode. By turning off the face identification or noise reduction performed when neither the high-speed mode nor portrait mode is detected, it is possible to prevent face identification on the image data without data on persons thus reducing the power consumption.

While a digital camera has been described as an example in the foregoing embodiments, the invention is also applicable to an application program for performing image processing.

Thus, the present invention includes an image processing program for performing image processing on image data, the program causing a computer to serve as means for generating face region information to identify the face region from the image data and means for performing noise reduction on the face region of the image data.

AS mentioned hereinabove, according to the invention, it is possible to identify the face region in an image to perform noise reduction on the face region so that it is possible to effectively reduce a noise on the face region to improve the picture quality of the entire image.

What is claimed is:

1. An image processing method for performing image processing on image data comprising:
   transferring said image data to a face identifying section of a device performing said image processing for generating face region information by identifying the face region from said image data;
   determining an operating mode of said device performing said image processing;
   transferring said face region information to a noise reduction section of said device for performing noise reduction on the face region of said image data based on said face region information; and
   controlling said face identifying section and said noise reduction section to be off when the determined operating mode comprises other than a high-speed operating mode and a portrait operating mode.

2. The image processing method according to claim 1, further comprising:
   performing contour correction on said image data and storing said contour-corrected image data in a memory of said device performing said image processing,
   wherein said identifying said face region comprises identifying said face region from said contour-corrected image data.

3. The image processing method according to claim 2 wherein said transferring said image data to a face identifying section comprises transferring said contour-corrected image data from said memory to another memory in said face identifying section.

4. A digital camera comprising:
   an image processing unit that performs image processing including contour correction on a shot image;
   a face region identification unit that analyzes an image after the contour correction to generate face region information to identify the face region;
   a noise reduction unit that performs noise reduction on the face region of the image after the contour correction based on said face region information;
   a photography mode determination unit that determines a photography mode of said shot image; and
   a control unit that controls said face region identification unit and said noise reduction unit to be off when said determined photography mode comprises other than a high-speed photography mode and a portrait photography mode.

5. The digital camera according to claim 4, further comprising:
   a photography mode switch on a main body of said camera,
   wherein said photography mode determination unit determines said photography mode based on a mode selection signal from the photography mode switch on the camera main body.

6. The digital camera according to claim 4, wherein said noise reduction unit performs noise reduction exclusively on said face region using a low-pass filter.

7. The digital camera according to claim 4, wherein said face region comprises a plurality of face regions, said face region identification unit identifying said plurality of face regions and said noise reduction unit performing noise reduction on said plurality of face regions.

8. The digital camera according to claim 4, wherein said control unit controls said face region identification unit and said noise reduction unit such that said identifying said face region and said performing said noise reduction are not performed when a mode other than a high-speed photography mode is determined by said photography mode determination unit.

9. The digital camera according to claim 4, further comprising:
   a shutter button and an operation switch which are connected to said control unit,
   wherein said control unit performs control including at least one of automatic focus, automatic exposure, and automatic white balance based on an input from one of said shutter button and said operation switch.

10. The digital camera according to claim 4, further comprising:
    a lens comprising an automatic focus mechanism.

11. The digital camera according to claim 10, further comprising:
    a charge-coupled device (CCD) in a position corresponding to a focal point of said lens.

12. The digital camera according to claim 11, further comprising:
    an analog signal processor for performing analog processing on a picture signal which is output from said CCD, and outputting RGB signals corresponding to said picture signal.

13. The digital camera according to claim 12, wherein said analog signal processor comprises a Correlated Double Sampling (CDS) circuit for performing noise reduction on said picture signal, and an Automatic Gain Control (AGC) circuit for performing level adjustment on said picture signal by way of gain adjustment.

14. The digital camera according to claim 12, further comprising:
    an analog-to-digital (A/D) converter which converts said RGB signals sequentially applied by the analog signal processor to digital RGB signals.

15. The digital camera according to claim 14, further comprising:
    a digital signal processor for converting said digital RGB signals to image data comprising luminance data and color-difference data.

16. The digital camera according to claim 15, further comprising:
    a memory for temporarily storing said image data.

17. The digital camera according to claim 16, wherein said face region identification unit receives said image data from said memory and generates said face region information by using said image data.

18. A programmable storage medium tangibly embodying an image processing program executable by a computer to perform an image processing method for performing image processing on image data, said method comprising:
    transferring said image data to a face identifying section of a device performing said image processing for generating face region information by identifying the face region from said image data;
    determining an operating mode of said device performing said image processing; transferring said face region information to a noise reduction section of said device for performing noise reduction on the face region of said image data based on said face region information; and
    controlling said face identifying section and said noise reduction section to be off when the determined operating mode comprises other than a high-speed operating mode and a portrait operating mode.

* * * * *